United States Patent Office.

CHRISTOPHER T. PROVOST, OF NEW YORK, N. Y.

Letters Patent No. 68,004, dated August 20, 1867.

IMPROVED ANTI-DYSPEPTIC BITTERS.

*The Schedule referred to in these Letters Patent and making part of the same.*

TO ALL WHOM IT MAY CONCERN:

Be it known that I, CHRISTOPHER T. PROVOST, of the city, county, and State of New York, have invented a new and improved Anti-Dyspepsia Bitters; and I do hereby declare that the following is a full, clear, and exact description thereof, which will enable others skilled in the art to make and use the same.

This invention relates to a new composition for curing dyspepsia and indigestion, and consists in the combination with hard cider of certain ingredients by which the anti-dyspeptic qualities of the old cider will be increased, and its flavor and taste improved.

This composition will be an excellent tonic, and not a stimulant, as most of the so-called stomack bitters generally are. No intoxicating liquor is used in the composition to impair its healthy qualities.

The mixture is composed of the following ingredients, in about the proportions set forth: Hard cider, sixteen hundred parts; Virginia snake root, twelve parts; radix gentian, twenty-four parts; orange peel, sixteen parts; calamus root, four parts; cardamom seed, three parts; making sixteen hundred and fifty-nine parts in all.

The orange peel is added to increase the flavor of the compound, as is also the cardamom seed. The other ingredients are added for their taste as well as for their excellent anti-dyspeptic qualities. In all, the composition will be a very healthy and agreeable innoxious beverage.

I claim as new, and desire to secure by Letters Patent—

1. The combination of hard cider with other ingredients, for anti-dyspeptic compounds.
2. An anti-dyspeptic stomach bitters, composed of the ingredients in the manner set forth.

CHRISTOPHER T. PROVOST.

Witnesses:
WM. F. MCNAMARA,
ALEX. F. ROBERTS.